United States Patent
Thompson et al.

(10) Patent No.: US 11,618,434 B2
(45) Date of Patent: Apr. 4, 2023

(54) METHOD FOR CONTROLLING MHT POWERTRAIN HARDWARE COMPONENTS AS A FUNCTION OF DRIVER DEMANDED RESPONSIVENESS

(71) Applicant: FORD GLOBAL TECHNOLOGIES, LLC, Dearborn, MI (US)

(72) Inventors: Scott James Thompson, Canton, MI (US); Rajit Johri, Canton, MI (US); Jason Meyer, Canton, MI (US); Francis Connolly, Ann Arbor, MI (US); Minku Lee, Ypsilanti, MI (US); Justin Panhans, Detroit, MI (US); Bradley Dean Riedle, Northville, MI (US); Arun Sebastian, Dearborn, MI (US); Ameya Gadre, Ypsilanti, MI (US); Corey James Blue, Belleville, MI (US); Andrew Burt, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 16/983,473

(22) Filed: Aug. 3, 2020

(65) Prior Publication Data
US 2022/0032903 A1 Feb. 3, 2022

(51) Int. Cl.
*B60W 20/40* (2016.01)
*B60W 10/06* (2006.01)
(Continued)

(52) U.S. Cl.
CPC ............ *B60W 20/40* (2013.01); *B60W 10/02* (2013.01); *B60W 10/06* (2013.01); *B60W 10/11* (2013.01);
(Continued)

(58) Field of Classification Search
CPC ...... B60W 20/40; B60W 10/02; B60W 10/06; B60W 10/11; B60W 2510/0638;
(Continued)

(56) References Cited

U.S. PATENT DOCUMENTS

| 2013/0211654 A1* | 8/2013 | Tanisshima | B60K 6/547 180/65.265 |
| 2013/0296109 A1* | 11/2013 | Nedorezov | B60W 10/08 477/5 |

(Continued)

FOREIGN PATENT DOCUMENTS

CN 110606073 A 9/2019

*Primary Examiner* — Richard W Ridley
*Assistant Examiner* — Aimee Tran Nguyen
(74) *Attorney, Agent, or Firm* — David B Kelley; Brooks Kushman P.C.

(57) ABSTRACT

A hybrid vehicle includes an electric machine, an engine selectively coupled to the electric machine by a disconnect clutch, and a controller. The controller is programmed to, in response to a change in the driver-demanded torque necessitating starting of the engine: determine a state of driving (SOD) based on the change in driver-demanded torque, wherein the SOD is indicative of a desired responsiveness of the vehicle, and the desired responsiveness increases as SOD increases; command a speed target to the engine equal to a predicted motor speed associated with the driver-demanded torque plus an offset that is based on the SOD; and command a capacity to the disconnect clutch at a rate and a magnitude based on the SOD.

19 Claims, 2 Drawing Sheets

(51) Int. Cl.
  *B60W 10/02* (2006.01)
  *B60W 10/11* (2012.01)
(52) U.S. Cl.
  CPC ............ *B60W 2510/0638* (2013.01); *B60W 2510/081* (2013.01); *B60W 2710/021* (2013.01); *B60W 2710/023* (2013.01); *B60W 2710/0644* (2013.01); *B60W 2710/1005* (2013.01)
(58) Field of Classification Search
  CPC ..... B60W 2510/081; B60W 2710/021; B60W 2710/023
  See application file for complete search history.

(56) References Cited

U.S. PATENT DOCUMENTS

| | | | | |
|---|---|---|---|---|
| 2013/0297105 | A1* | 11/2013 | Yamazaki | B60K 6/48 903/902 |
| 2014/0229044 | A1* | 8/2014 | Dai | B60K 6/387 903/902 |
| 2015/0239467 | A1* | 8/2015 | Wang | B60W 10/08 180/65.265 |
| 2018/0056980 | A1* | 3/2018 | Cho | B60K 28/16 |
| 2020/0001860 | A1 | 1/2020 | Rumetshofer et al. | |

* cited by examiner

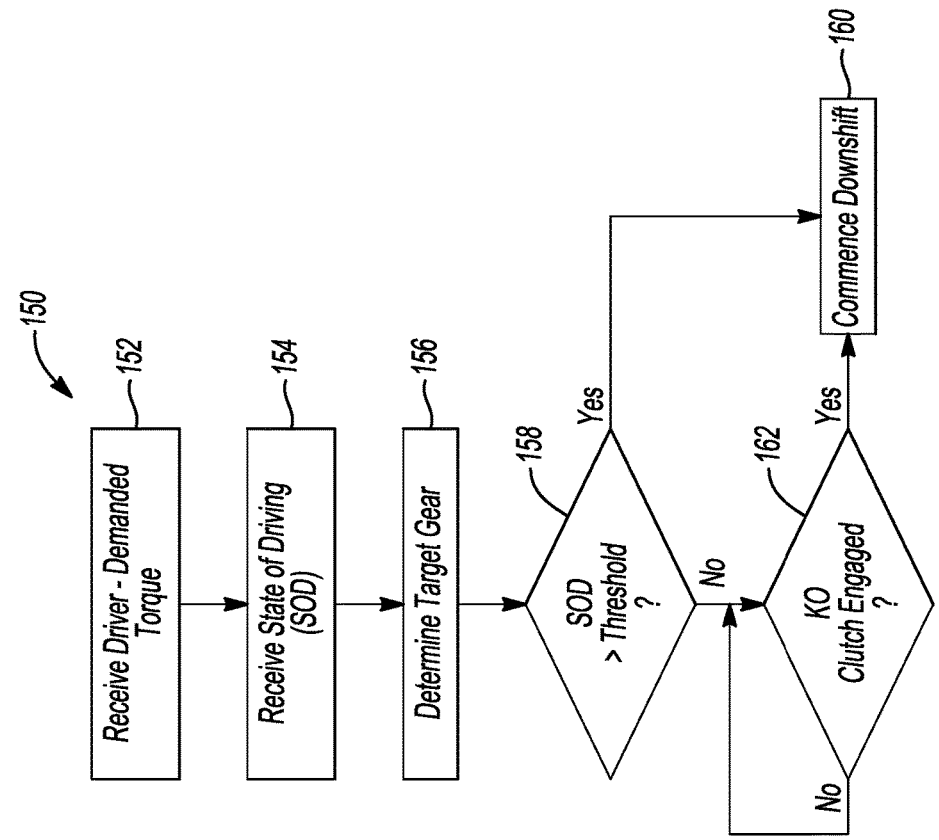
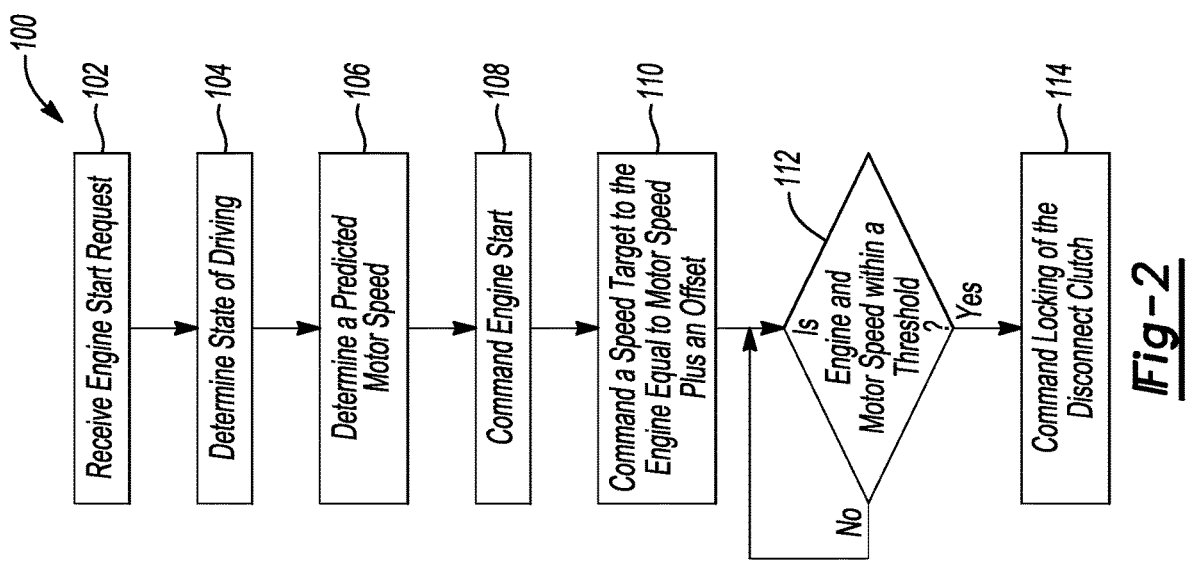

METHOD FOR CONTROLLING MHT POWERTRAIN HARDWARE COMPONENTS AS A FUNCTION OF DRIVER DEMANDED RESPONSIVENESS

TECHNICAL FIELD

The present disclosure relates to controlling electrified vehicle powertrains and more specifically to controlling the powertrain during an engine start.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery.

SUMMARY

According to one embodiment, a hybrid vehicle includes a traction battery, an electric machine powered by the traction battery, an engine, a disconnect clutch selectively coupling the engine and the electric machine, and a controller. The controller is programmed to, in response to a request to start the engine and a first state of driving (SOD) being detected, (i) command a first speed target to the engine equal to a predicted motor speed plus a first offset that is based on the first SOD and (ii) command locking of the disconnect clutch when a speed difference between the engine and the motor are less than a first threshold that is based on the first SOD. The controller is further programmed, in response to another request to start the engine and a second SOD being detected, (i) command a second speed target to the engine equal to a predicted motor speed plus a second offset that is based on the second SOD, and ii) command locking of the disconnect clutch when speeds of the engine and the motor are less than a second threshold that is based on the second SOD. The first offset is different than the second offset and the first threshold is different than the second threshold.

According to another embodiment, a hybrid vehicle includes an electric machine, an engine selectively coupled to the electric machine by a disconnect clutch, and a controller. The controller is programmed to, in response to a change in the driver-demanded torque necessitating starting of the engine: determine a state of driving (SOD) based on the change in driver-demanded torque, wherein the SOD is indicative of a desired responsiveness of the vehicle, and the desired responsiveness increases as SOD increases; command a speed target to the engine equal to a predicted motor speed associated with the driver-demanded torque plus an offset that is based on the SOD; and command a capacity to the disconnect clutch at a rate and a magnitude based on the SOD.

According to yet another embodiment, a method of controlling a hybrid powertrain during an engine start includes, in response to a request to start an engine and a first state of driving (SOD) being detected, (i) commanding a first speed target to the engine equal to a predicted motor speed plus a first offset that is based on the first SOD and (ii) commanding locking of a disconnect clutch, that connects the engine to an electric machine, when speeds of the engine and the electric machine are less than a first threshold that is based on the first SOD. The method further includes, in response to another request to start the engine and a second SOD being detected, (i) commanding a second speed target to the engine equal to a predicted motor speed plus a second offset that is based on the second SOD, and ii) commanding locking of the disconnect clutch when speeds of the engine and the electric machine are less than a second threshold that is based on the second SOD, wherein the first offset is different than the second offset and the first threshold is different than the second threshold.

BRIEF DESCRIPTION OF THE DRAWINGS

FIG. 2 is a flow chart of an algorithm for controlling an engine state according to different states of driving.

FIG. 3 is a flow chart of an algorithm for controlling a transmission during an engine state according to different states of driving.

DETAILED DESCRIPTION

Figure 1:
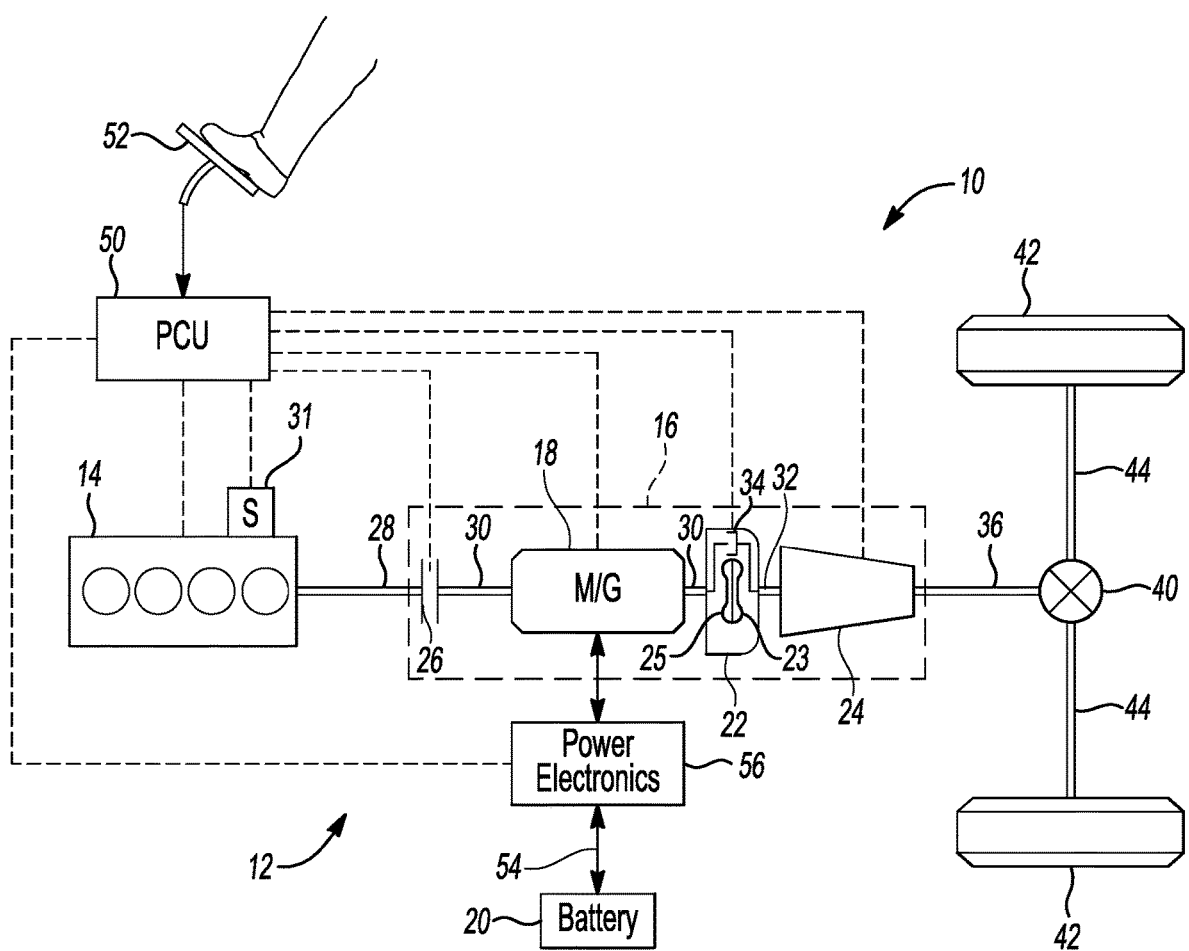
FIG. 1 is a schematic of a hybrid electric vehicle according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 23 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), randomaccess memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

In hybrid vehicles, such as vehicle 10 depicted in FIG. 1, the driveline torque is the summation of the engine torque and the motor torque less any slipping losses at the clutches such as the disconnect clutch. When the engine is pulled down due to various requests, driveline torque is solely provided by the motor. The engine may be started based on various driver requests to continue providing the propulsive torque required to meet the driver-demanded wheel torques. When the engine and the motor are connected, the requested torque may be based on the driver demand and the engine torque in order to maintain battery state of charge and improve fuel economy.

The disconnect clutch may be hydraulically actuated. In a hydraulically actuated clutch, the apply chambers of the piston must first be filled with fluid prior to any clutch capacity being generated. As such, the clutch is typically stroked in preparation for a locking event. This, however, creates parasitic drag across the clutch. The trade-off between parasitic drag and delayed clutch response are balanced to provide the appropriate performance and fuel economy. During testing, it was found that preparing the clutch and requesting assistance torque from the disconnect clutch during an engine start can reduce the time for connection by as much as 50% or more. When doing this, torque disturbances should be balanced out by the motor to reduce driveline disturbances that may lead to poor drivability. In order for the motor to balance out these disturbances, the disconnect clutch capacity is reported to the controller so that the appropriate motor torque can be commanded to keep the system balanced until the engine is connected to the impeller after engine start is complete.

After the engine start is complete and the disconnect clutch is fully engaged, the engine torque needs to be blended with the motor torque so that driveline disturbances are not generated. The proposed blending of the torque sources helps meet driver-demanded torque while also maintaining battery state of charge. Typically, the engine is started either because the battery state of charge has dropped below the threshold or additional torque from the engine is needed to meet the driver-demanded torque.

Since the engine is started for a variety of reasons and in different situations, different calibrations may be used specifically for these different reasons to provide optimum performance. For example, this allows for a smooth and slow engine start under low torque demand and a hard and fast engine start under high torque command. In the absence of the strategy, the calibration between smooth and fast engine starts for high and low driver demands cannot be balanced while mitigating driveline disturbances. One or more attribute would not be optimal in these different situations. This disclosure describes a strategy to apply and request engine torque, motor torque, and engine disconnect clutch torque capacity at different rates and magnitudes to provide the optimum performance for a wide range of conditions. Operation of the transmission may also be calibrated to match these different situations.

The powertrain calibrations may be broken down into different states of driving (SOD) with each corresponding to different driving scenarios. For ease of description, the vehicle will be described as having five states of driving with the first state of driving having the least amount of desired responsiveness and with the fifth state of driving having the highest amount of desired responsiveness. For example, the first SOD may be used when the vehicle is in Park, and the fifth SOD may be used when the driver sharply depresses the accelerator pedal to wide-open throttle. The vehicle may also have a cold-weather start calibration, which in some embodiments may be an additional state of driving. Five is merely an example and the vehicle may have more or less. The first state of driving may be used when the vehicle is not moving. The remaining four states of driving may be used when the vehicle is moving and may be delineated based on the driver-demanded torque. The different states of driving change the calibrations for the powertrain to best match the scenario associated with that state of driving. For example, an engine start during a high SOD, may include requesting engine torque during ramp-up to the connection such that the throttle command is high to keep the engine torque high and the engine speed increasing when the disconnect clutch fully engages. During the cold-start calibration, the engine torque spark may be selected so that the catalytic converter is optimized and the disconnect clutch may be used to control the engine at an idle speed.

The following factors may be modified for the various states of driving: the disconnect clutch capacity request, the disconnect clutch capacity application time, the disconnect clutch torque slew rate during locking, the disconnect clutch lock request timing (e.g., the speed threshold for requesting locking), the motor speed target, the engine speed target, the engine-speed offset, spark timing, engine speed control gains, motor torque buffer, driveline torque shaping rate, transmission shifting priority, and the like.

FIG. 2 illustrates a flowchart 100 of controls/methods for controlling an engine start based on different states of driving. The controls began at operation 102 in response to receiving an engine start request. The engine start request may be issued in response to an increased in driver-demanded torque, low battery state of charge, high accessory loads, or other factors. At operation 104, the controller determines the state of driving based on sensed conditions. The state of driving may be determined based on at least the driver-demanded torque and/or the accelerator pedal position. The controller may include memory that stores one or more lookup tables that correlate the driver-demanded torque and/or the accelerator pedal position with the various states of driving. For example, when the accelerator pedal is fully depressed, the state of driving may set to the highest state of driving, which in the above example is five. As discussed above, the state of driving changes the calibrations used during engine start and other controls of the powertrain.

In many instances, the engine is started in response to an increase in driver-demanded torque. In this situation, the transmission is typically downshifted as the driver is requesting increased acceleration. The transmission controller is programmed to determine the appropriate gear according to a shift schedule that includes the accelerator-pedal position as an input. When the driver tips in on the accelerator pedal, the transmission controller determines a target gear for the downshift. The increased gear ratio of the lower target gear results in increases speed of the transmission input shaft, which in the illustrated embodiment of FIG. 1 is synonymous with motor speed. At operation 106, the controller determines a predicted motor speed based on at least the target gear and the wheel speed.

At operation 108, the controller commands engine start. In order to lock the engine and the motor with the disconnect clutch, the relative speeds between these actuators needs to be within a threshold to prevent excessive jerk or other driveline disturbances. This threshold varies based on the state of driving. The speed target for the engine may be equal to the predicted motor speed of operation 106 plus an offset. (The offset functions as the above-described threshold.) Modifying the offset changes the aggressiveness of the engine start. The offset may be a negative value that results in the engine connecting to the motor prior to the speed target being reached, i.e., the motor is used to pull up the engine. A negative offset may be used in the higher states of urgencies to reduce the engine start time. Alternatively, a positive offset may be used that results in a speed overshoot of the engine. This may be used in the lower states of urgencies to provide a smoother albeit slower connection. At operation 110, the controller commands a speed target to the engine equal to motor speed plus the offset.

At operation 112, the controller determines if the engine and motor speeds are within a threshold. Memory of the controller may store one or more lookup tables having different speed thresholds for different states of driving. The higher states of driving may have a larger threshold to encourage faster engagement of the disconnect clutch, whereas lower states of driving may have a smaller threshold to reduce disturbances during locking of the disconnect clutch. Operation 112 loops until the speeds are within the threshold associated with the determine state of driving.

If yes at operation 112, the controller commands locking of the disconnect clutch at operation 114. Locking of the disconnect clutch, includes several controllable parameters that may be modified to suit different states of driving. For example, the command locking of the disconnect clutch may include commanding a capacity and commanding a capacity slew rate. The capacity and the slew rate may increase with the states of driving so that the disconnect clutch locks harder and faster for the upper states of driving and a softer and slower for the lower states of driving.

FIG. 3 illustrates a flowchart 150 of controls/methods for controlling the transmission during an engine start based on different states of driving. At operation 152, the controller receives the driver-demanded torque. At operation 154, the controller receives the state of driving that was previously determined at operation 104. The controller is programmed to determine the appropriate target gear of the transmission based on one or more of the driver-demanded torque, the transmission shift schedule, the vehicle speed, and the state of driving. At operation 156, the controller determines the target gear (sometimes referred to as the oncoming gear). At operation 158, the controller determines if the state of driving is above a threshold. The threshold may be one of the intermediate states of driving such as three and is generally used to delineate high states of driving versus low states of driving. In the illustrated embodiment of FIG. 3, the downshift immediately occurs for higher states of urgencies and is delayed until after engagement of the disconnect clutch for the lower states of driving. Thus, if yes at operation 158, control passes to 160 and the transmission is downshifted concurrent with starting of the engine. If no, control passes to operation 162 where the controller determines if the KO clutch is engaged. If no, control loops. If yes, the downshift is commenced at operation 160 after the disconnect clutch is engaged.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
a traction battery;
an electric machine powered by the traction battery;
an engine;
a disconnect clutch selectively coupling the engine and the electric machine; and
a controller programmed to:
in response to a request to start the engine and a first state of driving (SOD) being detected, (i) command a first speed target to the engine equal to a predicted motor speed plus a first offset that is based on the first SOD and (ii) command locking of the disconnect clutch when a speed difference between the engine and the motor are less is less than a first threshold that is based on the first SOD, and
in response to another request to start the engine and a second SOD being detected, (i) command a second speed target to the engine equal to a predicted motor speed plus a second offset that is based on the second SOD, and ii) command locking of the disconnect clutch when a speed difference between the engine and the motor is less than a second threshold that is based on the second SOD, wherein the first offset is different than the second offset and the first threshold is different than the second threshold.

2. The hybrid vehicle of claim 1 further comprising an accelerator pedal, wherein the controller is further programmed to determine the first and second SOD based on actuation of the accelerator pedal.

3. The hybrid vehicle of claim 1, wherein the controller is further programmed to determine the first and second SOD based on a driver-demanded torque.

4. The hybrid vehicle of claim 1, wherein the command locking of the disconnect clutch includes commanding a capacity and commanding a capacity slew rate, wherein the capacity and the slew rate commanded for the first SOD is less than the capacity and the slew rate commanded for the second SOD.

5. The hybrid vehicle of claim 1, wherein the controller is further programmed to, in response to yet another request to start the engine and a third SOD being detected, (i) command a third speed target to the engine equal to a predicted motor speed plus a third offset that is based on the second SOD, and ii) command locking of the disconnect clutch when speeds of the engine and the motor are less than a third threshold that is based on the third SOD, wherein the third offset is greater than the second offset and the third threshold is greater than the second threshold.

6. The hybrid vehicle of claim 1 further comprising a multi-speed transmission having an input shaft fixed to the electric machine, and wherein the controller is further programmed to, in response to the request to start the engine and the first state of driving (SOD) being detected, delay shifting of the transmission until the disconnect clutch is locked.

7. The hybrid vehicle of claim 6, wherein the controller is further programmed to, in response to the another request to start the engine and the second state of driving (SOD) being detected, command shifting of the transmission concurrent with the starting of the engine.

8. The hybrid vehicle of claim 7, wherein the shifting is downshifting to a lower gear ratio.

9. The hybrid vehicle of claim 1, wherein the offset increases as the SOD decreases.

10. A hybrid vehicle comprising:
an electric machine;
an accelerator pedal;
an engine selectively coupled to the electric machine by a disconnect clutch; and
a controller programmed to, in response to a change in the driver-demanded torque necessitating starting of the engine:
determine a state of driving (SOD) based on the change in driver-demanded torque and actuation of the accelerator pedal, wherein the SOD is indicative of a desired responsiveness of the vehicle, and the desired responsiveness increases as the SOD increases,
command a speed target to the engine equal to a predicted motor speed associated with the driver-demanded torque plus an offset that is based on the SOD, and
command a capacity to the disconnect clutch at a rate and a magnitude based on the SOD.

11. The hybrid vehicle of claim 10, wherein the controller has associated memory including at least first and second SOD.

12. The hybrid vehicle of claim 11, wherein the offset associated with first SOD is less than the offset associated with the second SOD.

13. The hybrid vehicle of claim 12, wherein the rate and the magnitude associated with the second SOD are greater than the rate and the magnitude associated with the first SOD.

14. The hybrid vehicle of claim 10 further comprising a multi-speed transmission having an input shaft fixed to the electric machine.

15. The hybrid vehicle of claim 14, wherein the controller is further programmed to, command the transmission to downshift to a gear ratio associated with the driver-demanded torque, wherein a timing of the downshift command is based on the SOD.

16. The hybrid vehicle of claim 15, wherein the controller has associated memory including at least first and second SOD and is configured to command the downshift prior to locking of the disconnect clutch during the second SOD and to command the downshift after locking of the disconnect clutch during the first SOD.

17. A method of controlling a hybrid powertrain during an engine start, comprising:
in response to a request to start an engine and a first state of driving (SOD) being detected, (i) commanding a first speed target to the engine equal to a predicted motor speed plus a first offset that is based on the first SOD and (ii) commanding locking of a disconnect clutch, that connects the engine to an electric machine, when a speed difference between the engine and the electric machine is less than a first threshold that is based on the first SOD, and
in response to another request to start the engine and a second SOD being detected, (i) commanding a second speed target to the engine equal to a predicted motor speed plus a second offset that is based on the second SOD, and ii) commanding locking of the disconnect clutch when a speed difference between the engine and the electric machine is less than a second threshold that is based on the second SOD, wherein the first offset is different than the second offset and the first threshold is different than the second threshold.

18. The method of claim 17, wherein the commanding locking of the disconnect clutch includes commanding a capacity and commanding a capacity slew rate, wherein the capacity and the slew rate commanded for the first SOD is less than the capacity and the slew rate commanded for the second SOD.

19. The method of claim 17 further comprising:
in response to the request to start the engine and the first SOD being detected, delay shifting of a transmission until the disconnect clutch is locked; and
in response to the another request to start the engine and the second SOD being detected, commanding shifting of the transmission in concert with the starting of the engine.

* * * * *